United States Patent [19]
Maruta

[11] Patent Number: 4,571,026
[45] Date of Patent: Feb. 18, 1986

[54] DRIVING APPARATUS FOR AN OBJECTIVE LENS
[75] Inventor: Keiji Maruta, Yokohama, Japan
[73] Assignee: Sony Corporation, Tokyo, Japan
[21] Appl. No.: 558,510
[22] Filed: Dec. 6, 1983
[30] Foreign Application Priority Data
Dec. 8, 1982 [JP] Japan ................. 57-215124
[51] Int. Cl.⁴ .......................... G02B 7/02; G02B 7/04
[52] U.S. Cl. ..................................... 350/247; 350/255
[58] Field of Search ............................. 350/255, 247; 369/44–45; 310/13, 27; 318/115

[56] References Cited
U.S. PATENT DOCUMENTS
3,814,550 6/1974 Adams .................. 417/417
4,349,265 9/1982 Kobayashi et al. ........... 350/255
4,473,274 9/1984 Yano et al. .................. 350/255
4,482,988 11/1984 Tsurushima et al. ......... 350/255

Primary Examiner—William H. Punter
Attorney, Agent, or Firm—Lewis H. Eslinger; Alvin Sinderbrand

[57] ABSTRACT

An insertion hole is formed in an objective lens holder which receives at least a distal end of a member arranged inwardly of the holder in substantially the axial direction of a support shaft.

The objective lens holder can be made thin in the axial direction of the support shaft without requiring the member to be reduced in size, and an objective lens drive device can be made thin without causing degradation of sensitivity.

2 Claims, 9 Drawing Figures

DRIVING APPARATUS FOR AN OBJECTIVE LENS

BACKGROUND OF THE INVENTION

1. Field of the Invention

The present invention relates to an objective lens drive device which has an objective lens holder mounted on by a support shaft to be movable at least in the axial direction of the support shaft.

2. Description of the Prior Art

Figure 1:
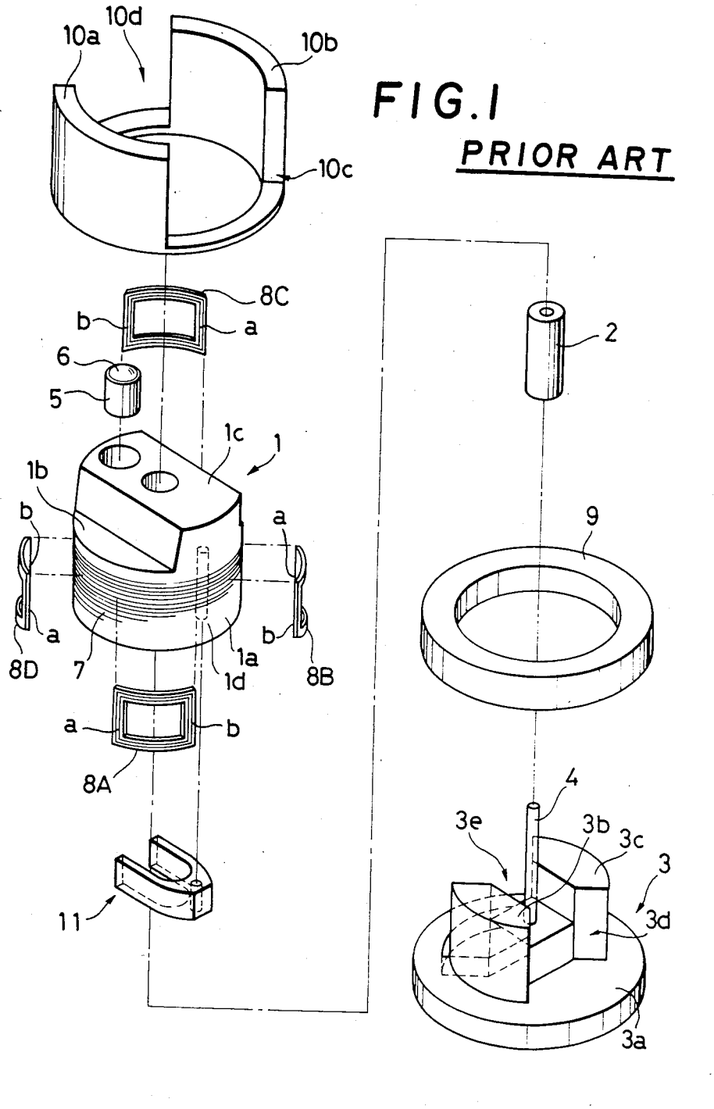
FIG. 1 is an exploded perspective view thereof.
Figure 2:
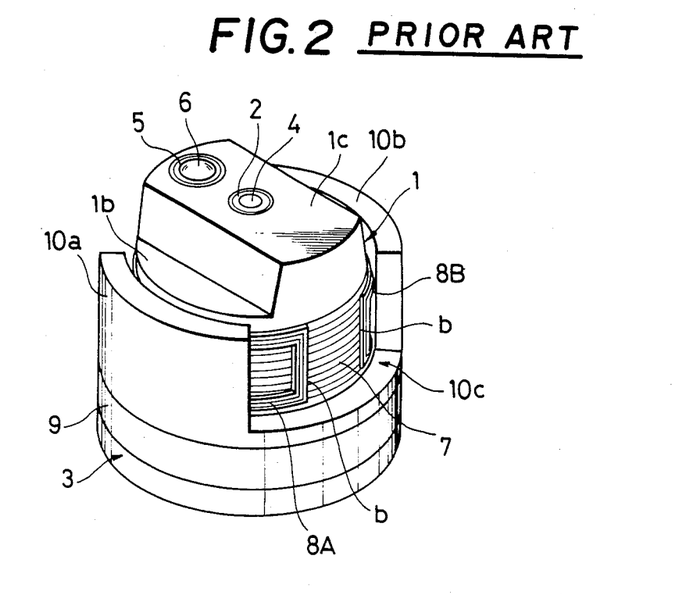
FIG. 2 is a perspective view thereof.
Figure 3:
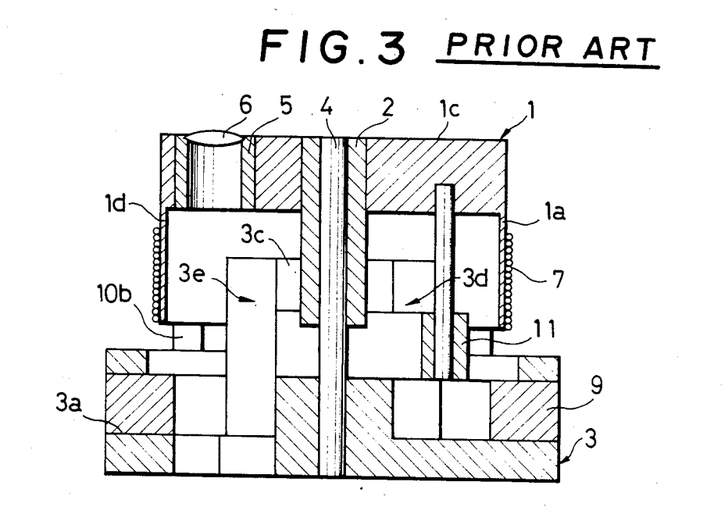
FIG. 3 is a longitudinal sectional view thereof.

A conventional objective lens drive device of the biaxial drive type as shown in FIGS. 1 to 3 is known. Such objective lens drive device has a focusing control function for controlling the movement of the objective lens in the direction of the optical axis and also a tracking control function for controlling the movement of the objective lens in the direction perpendicular to the optical axis. This device will be described in more detail with reference to FIGS. 1 to 3.

An objective lens holder 1 consists of an integral assembly of a cylinder 1a and an end plate 1b. The upper end of a bearing 2 is inserted through the central portion of the lens holder 1 and is fixed thereto. The upper end of a support shaft 4 is slidably inserted in the bearing 2 while the lower end of the support shaft 4 is inserted in a substantially circular base 3. In other words, the objective lens holder 1 is supported by the support shaft 4 through the bearing 2 such that it is rotatable around the support shaft 4 and is slidable along the axial direction of the support shaft 4.

An objective lens 6 is held through a lens frame 5 at a position in a projection 1c of the end plate 1b of the objective lens holder 1, which is spaced apart from the axis of the support shaft 4. The objective lens 6 is supported such that its optical axis is parallel to the axis of the support shaft 4.

A focusing coil 7 is wound around a circumferential wall 1d of the objective lens holder 1 having the axis of the support shaft 4 as a central axis. Four substantially square tracking coils 8A to 8D are adhered in a layered manner on the outer surface of the focusing coil 7 at equal intervals along the circumferential direction. Opposing sides a and b of each tracking coil are kept parallel to the axis of the support shaft 4.

A pair of inner yokes 3b and 3c extend from an upper surface 3a of the base 3 and project inside the objective lens holder 1 such that the yokes 3b and 3c oppose each other with the support shaft 4 interposed therebetween. A pair of first notches 3d and 3e are formed at the sides of the support shaft 4, which is sandwiched between the pair of yokes 3b and 3c. A ring-shaped magnet 9 and a pair of connected outer yokes 10a and 10b are arranged outside the inner yokes 3b and 3c and extend the first notches 3d and 3e and outside the objective lens holder 1. The outer yokes 10a and 10b are connected to the upper side surface of the magnet 9. Second notches 10c and 10d are formed between the outer yokes 10a and 10b. The outer yokes 10a and 10b and the second notches 10c and 10d are arranged to be opposed to the inner yokes 3b and 3c and to the first notches 3d and 3e, respectively, through the circumferential wall 1d of the objective lens holder 1.

The circumferential wall 1d of the objective lens holder 1 is located such that the focusing coil 7 and the sides a of the tracking coils 8A to 8D are arranged in the magnetic gap of a magnetic circuit consisting of the inner yokes 3b and 3c, the outer yokes 10a and 10b, and the magnet 9, or a magnetic gap defined between the inner yokes 3b and 3c and the outer yokes 10a and 10b.

In the above-mentioned magnetic gap, a magnetic field is formed in the direction perpendicular to the circumferential wall 1d of the obejctive lens holder 1. Therefore, the objective lens holder 1 is electromagnetically driven in the focusing direction, that is, in the axial direction of the support shaft 4 by a current flowing in focusing coil 7 along the circumferential direction of the circumferential surface 1d, that is, a current flowing along the circumferential direction of a circle having the axis of the support shaft 4 as a center. At the same time, the objective lens holder 1 is also electromagnetically driven in the tracking direction, that is, in the pivoting direction around the axis of the support shaft 4, by currents flowing in the sides a of the tracking coils 8A to 8D in the same direction parallel with the axial direction of the support shaft 4.

A damper member 11 of rubber or the like is interposed between the objective lens holder 1 and the base 3. The damper member 11 serves as a neutral position holding mechanism which automatically returns the objective lens holder 1 to the neutral position when the objective lens holder 1 is released from being driven in the focusing or tracking direction.

If the objective lens holder 1 of the device described above is made thinner in the axial direction of the support shaft so as to render the overall device thinner, the distal ends of the inner yokes 3b and 3 arranged inwardly of the objective lens holder abut against the end plate of the objective lens holder. If the inner yokes are reduced in size so as to prevent this, the opposing areas between the inner yokes 3b and 3c and outer yokes 10a and 10b are reduced, and a sufficient magnetic force cannot be obtained. In other words, a sufficient driving force required for focusing or tracking cannot be obtained, resulting in a low sensitivity.

SUMMARY OF THE INVENTION

The present invention has been made in consideration of this and has for its object to provide an objective lens drive device which can be made thin without impairing sensitivity.

According to an aspect of the present invention, insertion holes are formed in the objective lens holder and are dimensioned and positioned to receive in a direction parallel with the axis of a support shaft at least the distal ends of yoke members which are arranged inwardly of the objective lens holder.

The device of the present invention has the following effects.

Since such insertion holes are formed in the objective lens holder so as to receive in the direction parallel with the axis of the support shaft at least the distal ends of yoke members which are arranged inwardly of the objective lens holder, the objective lens holder can be dimensionally reduced in that direction without reducing the size of the yoke and coil members in the axial direction of the objective lens holder. Therefore, the device can be made smaller without degradation of sensitivity which is caused if the yoke and coil members are reduced in size.

Furthermore, since such insertion holes are formed in the objective lens holder, the weight of the objective lens holder is reduced. Thus, the weight of a movable member is reduced, resulting in a higher sensitivity.

Due to the presence of the insertion holes, the area of a portion of the objective lens holder extending perpendicular to the axis of the support shaft is reduced, so that acoustic noise is reduced.

If insertion holes of suitable shapes are formed in the objective lens holder to receive the yoke members, the yoke members serve as stoppers when the objective lens holder pivots excessively around the support shaft. Accordingly, excessive stress is prevented from acting on the neutral position holding mechanism, and the reliability of the device is improved.

BRIEF DESCRIPTION OF THE DRAWINGS

FIGS. 1 to 3 are views showing a conventional objective lens drive device, in which FIGS. 4A and 4B to 8 are views showing an objective lens drive device according to an embodiment of the present invention, in which

DETAILED DESCRIPTION OF THE PREFERRED EMBODIMENT

The preferred embodiment of the present invention will now be described with reference to the accompanying drawings.

Figure 7:
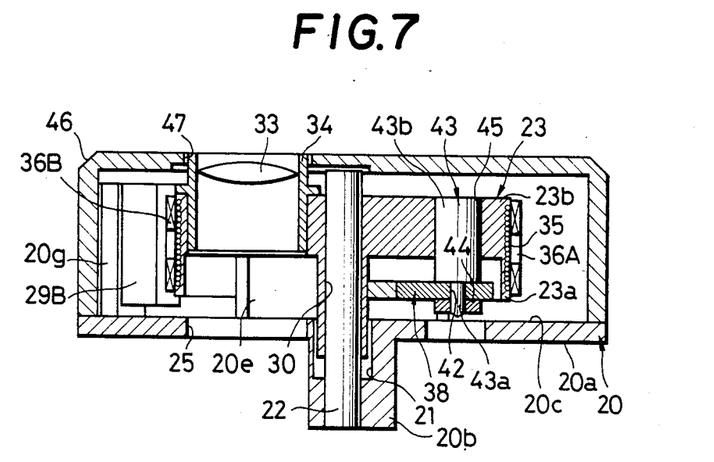
FIG. 7 is a sectional view along the line VII—VII in FIG. 6.
Figure 8:
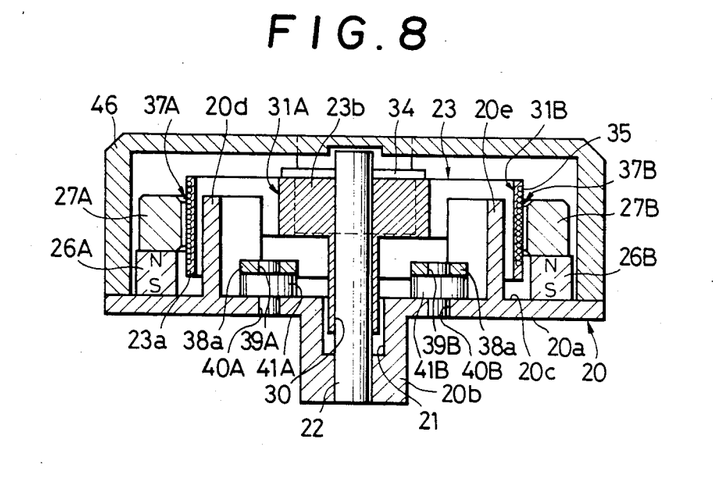
FIG. 8 is a sectional view along the line VIII—VIII in FIG. 6.

As shown particularly on FIGS. 7 and 8, a tubular projection 20b projects downward from the central portion of a lower surface 20a of a square base 20. The lower end of a support shaft 22 is pressed into an inner hole 21 of the tubular projection 20b. A pair of first yokes 20d and 20e (FIGS. 4B and 8) oppose each other with the support shaft 22 interposed therebetween at the central portion of an upper surface 20c of the base 20. The first yokes 20d and 20e are in the form of arcuate plates, which define partial arcs of a circle having the axis of the support shaft 22 as its center. The first yokes 20d and 20e are arranged in a space which is defined inwardly of an objective lens holder 23 to be described later. First notches 24A and 24B (FIG. 4B) are defined between these first yokes 20d and 20e.

Figure 4A:
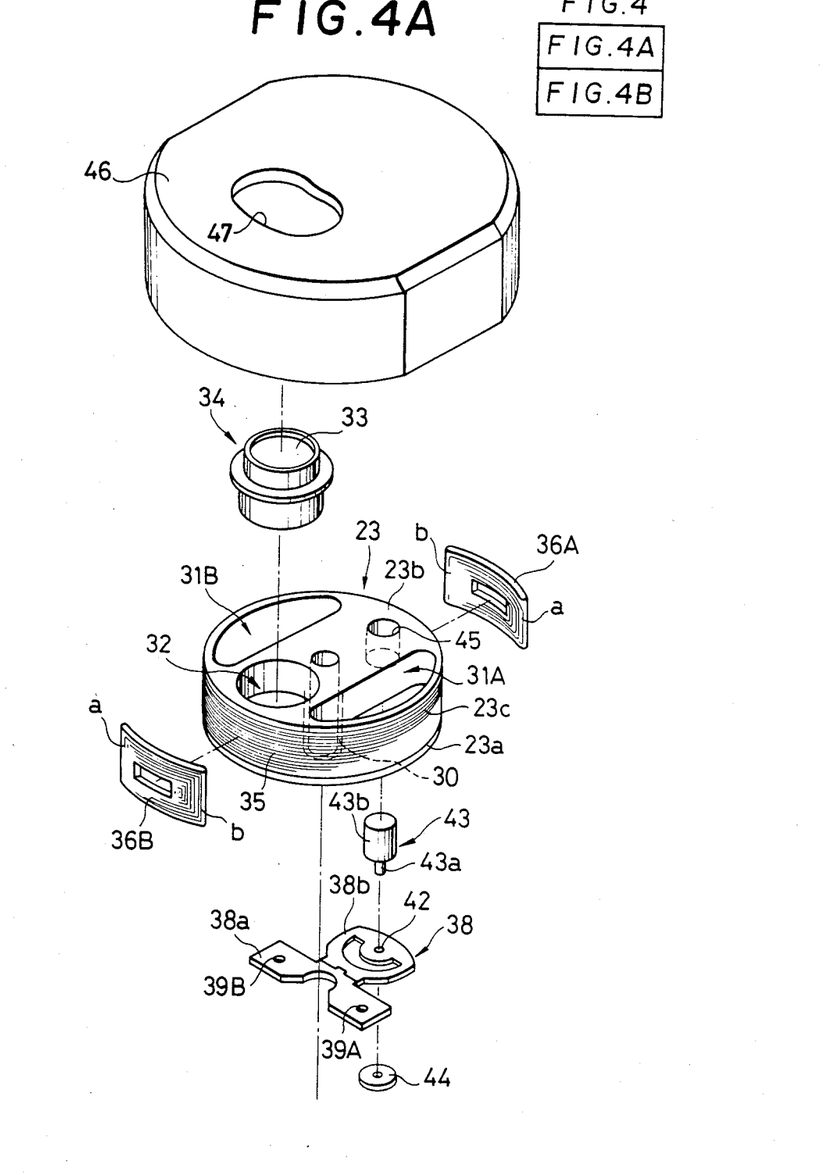
FIGS. 4A and 4B are exploded perspective views thereof.
Figure 4B:
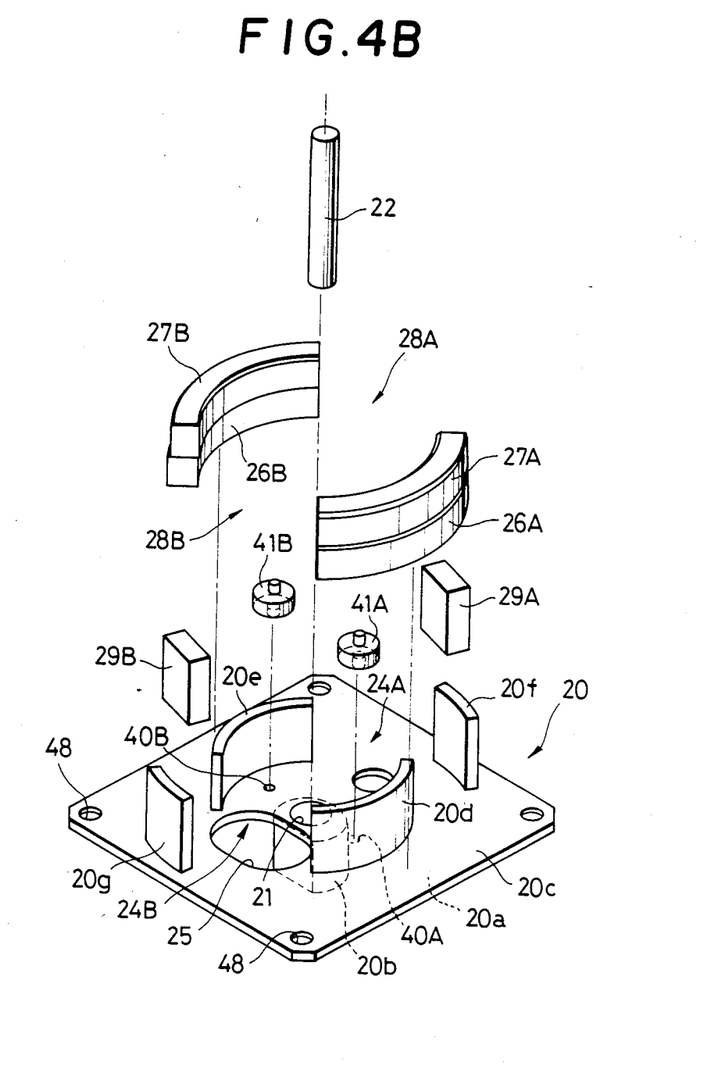
Figure 5:
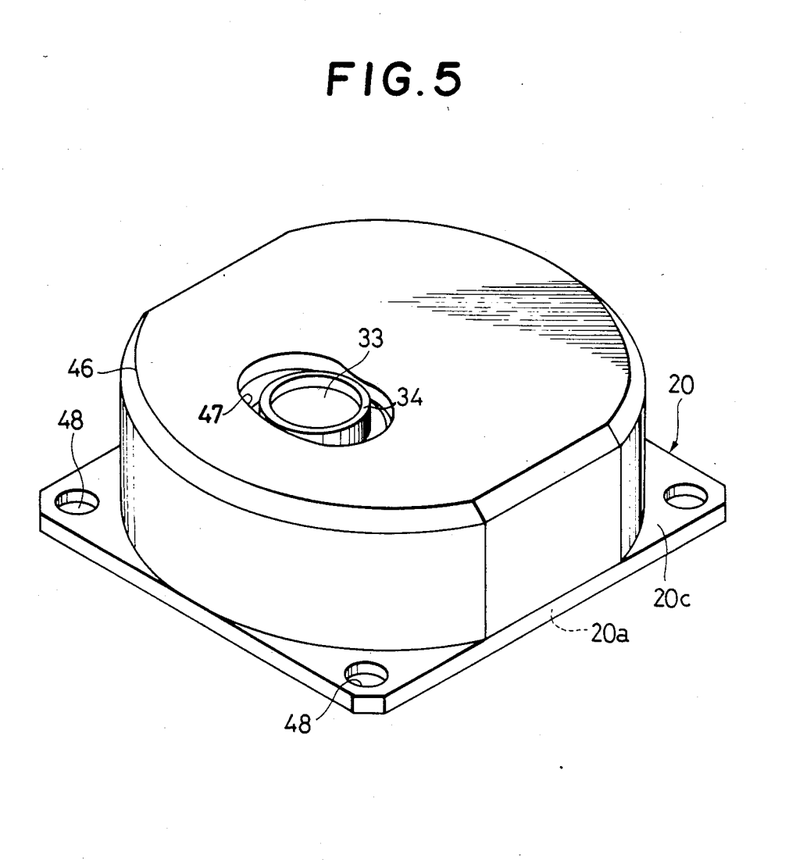
FIG. 5 is an assembled perspective view thereof.

A pair of second yokes 20f and 20g also in the shape of arcuate plates, are arranged to oppose each other through the first notches 24A and 24B and are situated on another circle (outside the circle of the first yokes) on the upper surface 20c having the axis of the support shaft 22 as its center. The second yokes 20f and 20g are intended to be arranged outside the objective lens holder 23.

The tubular projection 20b, the first yokes 20d and 20e, and the second yokes 20f and 20g are integrally formed of a magnetic material. An elliptical optical window 25 (FIGS. 4B and 7) is formed in the base 20 so as to communicate with the first notch 24B. A laser beam (not shown) is suitably guided through the optical window 25.

A pair of first magnets 26A and 26B (FIGS. 4B and 8) are mounted on the upper surface 20c of the base 20 outside the first yokes 20d and 20e and on still another circle having the axis of the support shaft 22 as its center. The first magnets 26A and 26B are opposed to the first yokes 20d and 20e, respectively, at equal distances.

The first magnets 26A and 26B are arranged outside the objective lens holder 23. A pair of third yokes 27A and 27B of arcuate shape are formed integrally with the upper surfaces of the first magnets 26A and 26B, respectively. Therefore, the third yokes 27A and 27B are similarly arranged outside the objective lens holder 23. Thus, a pair of second notches 28A and 28B are formed between the first magnet 26A and the corresponding third yoke 27A and the first magnet 26B and the corresponding third yoke 27B.

A pair of second magnets 29A and 29B of rectangular shape are adhered to the inner surfaces of the second yokes 20f and 20g, respectively, so as to be outside the objective lens holder 23.

The objective lens holder 23 (FIGS. 4A, 6, 7, and 8) comprises an integral structure consisting of a flat cylinder 23a which is short along the axial direction, and an end plate 23b of circular shape arranged at the upper end of the cylinder 23a. The material of the objective lens holder 23 may be aluminum or duralumin which has a small specific gravity, but is preferably a non-metallic material such as a resin or ceramic so as to prevent generation of an eddy current.

A bearing hole 30 is formed at the center of the objective lens holder 23 so as to extend therethrough. The upper end of the support shaft 22 is inserted into the bearing hole 30. The support shaft 22 supports the objective lens holder 23 through the bearing hole 30 such that the objective lens holder 23 is pivotable around the support shaft 22 and is slidable along the axial direction of the support shaft 22.

A pair of insertion holes 31A and 31B are formed in the end plate 23b of the objective lens holder 23 so as to have the bearing hole 30, that is, the support shaft 22, interposed therebetween. The insertion holes 31A and 31B receive the distal ends of the first yokes 20d and 20e in the axial direction of the support shaft 22. The sections of the insertion holes 31A and 31B have segment-like shapes such that the arcs extend along a circumferential wall 23c of the objective lens holder 23. A lens hole 32 is formed between the insertion holes 31A and 31B at a position spaced apart from the bearing hole 30 with the axis of hole 32 being parallel with the axial direction of the support shaft 22.

A lens frame 34 holding an objective lens 33 therein is fitted and held inside the lens hole 32. The objective lens 33 is held such that the optical axis thereof is parallel to the axis of the support shaft 22.

Figure 6:
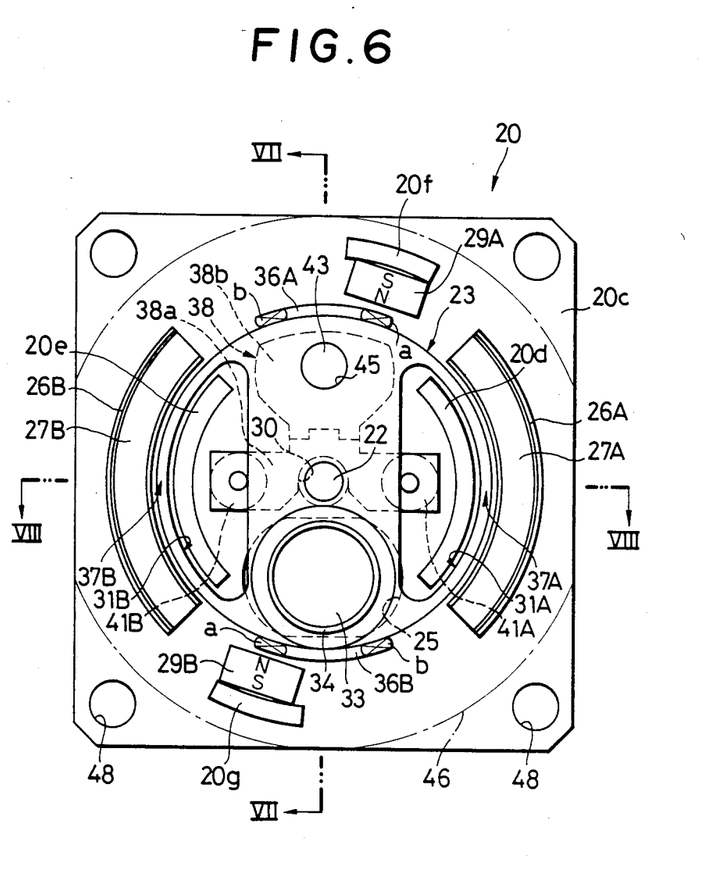
FIG. 6 is a plan view thereof.

A focusing coil 35 is wound around the circumferential wall 23c of the objective lens holder 23, which extends along a circle having the axis of the support shaft 22 as its center. Two substantially square tracking coils 36A and 36B are adhered in a layered form around the surface of the focusing coil 35 at equal intervals along a circle having the axis of the support shaft 22 as its center. The tracking coils 36A and 36B are angularly displaced by 90° from the insertion holes 31A and 31B formed at the two sides of the support shaft 22 as shown in FIG. 6. At the same time, each of the tracking coils 36A and 36B has a set of sides a and b which extend along the axial direction of the support shaft 22.

The first yokes 20d and 20e, the third yokes 27A and 27B, and the first magnets 26A and 26B constitute a first magnetic circuit. The circumferential wall 23c of the objective lens holder 23 is located such that the portions of the focusing coil 35 around which the tracking coils 36A and 36B are not formed and which extend along the circle having the axis of the support shaft 22 as its center are arranged in a pair of magnetic gaps 37A and 37B which are respectively formed between the first yokes 20d and 20e and the third yokes 27A and 27B of the first magnetic circuit.

The second yokes 20f and 20g and the second magnets 29A and 29B constitute a second magnetic circuit. The circumferential wall 23c is located such that the sides a of the tracking coils 36A and 36B are arranged inwardly of the second magnets 29A and 29B, that is, at the sides of the latter facing toward the support shaft 22.

When the first magnets 26A and 26B have magnetic poles as shown in FIG. 8, upon supply of a current to the focusing coil 35 in the clockwise direction in FIG. 6, the objective lens holder 23 is driven downward (along a direction perpendicular to the sheet of the drawing). When a current is supplied in the counterclockwise direction, the objective lens holder 23 is driven upward (along the direction perpendicular to the sheet of the drawing), thereby performing focusing control.

When the second magnets 29A and 29B have magnetic poles as shown in FIG. 6, the objective lens holder 23 is driven clockwise upon supply of a current the tracking coils 36A and 36B in the direction causing flow through sides a thereof in the upward direction perpendicular to the sheet of the drawing. On the other hand, if a current is supplied in the direction causing flow through sides a of coils 36A and 36B in the downward direction perpendicular to the sheet of the drawing, the objective lens holder 23 is driven in the counterclockwise direction to perform tracking.

The objective lens holder 23 is electromagnetically driven in the manner as has been described above. An elastic support member 38 as a neutral position holding mechanism is interposed between the base 20 and the objective lens holder 23. The elastic support member 38 serves to automatically return the objective lens holder 23 to the neutral position when focusing or tracking drive is released.

The elastic support member 38 comprises, for example, a mount piece 38a such as a metal plate, and an elastic support plate 38b of silicone rubber or the like baked at one end of the piece 38a. The elastic support member 38 is fixed to the base 20 by inserting one end of each of a pair of mounting pins 41A and 41B in a pair of small holes 39A and 39B formed in the mount piece 38a. The other ends of the pins 41A and 41B are inserted in a pair of holes 40A and 40B formed in the base 20 with the support shaft 22 interposed therebetween. A small diameter portion 43a at one end of a support column 43 of a plastic or the like is inserted in a small hole 42 formed at substantially the center of the elastic support plate 38b and in a collar 44, thereby coupling the elastic support member 38 and the support column 43. A large diameter portion 43b at the other end of the support column 43 is fitted in a hole 45 formed in the objective lens holder 23 along the axial direction of the support shaft 22 so as to oppose the lens hole 32 with the support shaft 22 interposed therebetween. Thus, the objective lens holder 23 and the elastic support member 38 are coupled through the support column 43.

A storage cover 46 protectively contains the objective lens holder 23 and the other above described components and has an opening 47 at a position corresponding to the objective lens 33. Reference numeral 48 denotes screw holes through which base 20 may be secured.

In the embodiment described above, the second yokes 20f and 20g are incorporated so as to constitute the second magnetic circuit. However, the second yokes 20f and 20g may be omitted. A second magnetic circuit may be similarly formed for the sides b of the tracking coils 36A and 36B.

In this embodiment, the first and second magnetic circuits are formed exclusively for the focusing coil 35 and exclusively for the tracking coils 36A and 36B respectively. Then, the magnetic gaps 37A and 37B formed between the first yokes 20d and 20e and the third yokes 27A and 27B of the first magnetic circuit are narrowed, and a higher magnetic force for forcusing is obtained.

The focusing coil 35 and the tracking coils 36A and 36B are superposed or layered on each other. And, the circumferential wall 23c of the objective lens holder 23 is not in the form of a double structure of two concentric circles having the axis of the support shaft 22 as their common center. For this reason, the weight of the objective lens holder 23, that is, of the movable member, is not increased, so that focusing sensitivity is not impaired. In addition to the fact that the weight of the movable member is not increased, the diameter of the objective lens holder 23 in the direction perpendicular to the axis of the support shaft 22 is reduced. The inertia of the objective lens holder 23 is not increased, and tracking sensitivity is improved.

In other words, even if the objective lens holder 23 is made thin in the axial direction of the support shaft 22, a sufficient driving force is obtained and at the same time sensitivity is not impaired.

Moreover, since the insertion holes 31A and 31B are formed in the objective lens holder 23, the weight of the movable member is reduced, and sensitivity is improved.

As one first effect of the insertion holes 31A and 31B, the overall width of the circumferential wall 23c of the objective lens holder 23 along the axial direction of the support shaft 22 is located within the magnetic gaps 37A and 37B formed between the first yokes 20d and 20e and the third yokes 27A and 27B. Accordingly, the overall width of the circumferential wall 23c of the objective lens holder 23 can be effectively utilized for the focusing coil 35 and the tracking coils 36A and 36B. This allows realization of a still thinner objective lens holder 23.

As another effect of the insertion holes 31A and 31B, the area of the end plate 23b of the objective lens holder 23 extending along the direction perpendicular to the axis of the support shaft 22 is reduced in this direction, and acoustic noise is reduced.

As still another effect of the insertion holes 31A and 31B, the first yokes 20d and 20e engaging therein serve as stoppers to prevent excessive rotation of the objective lens holder 23 around the support shaft 22, thus preventing any excessive stress from acting on the elastic support member 38 as a neutral position holding mechanism.

What is claimed is:

1. An objective lens drive device comprising a base member having a support shaft extending therefrom, a lens holder member including a cylindrical side wall and an end wall extending across said side wall, said end wall having bearing means therein slidable axially on said support shaft, an objective lens mounted in said end wall for adjusting the focus of said objective lens in response to the axial sliding of said holder member along said shaft, a focusing coil wound circumferentially on the outer surface of said cylindrical side wall, and a magnetic circuit including a magnet, an inner yoke member extending from said base member within said cylindrical side wall and an outer yoke member arranged outside of said cylindrical side wall so that said focusing coil is situated in a magnetic gap of said magnetic circuit and causes said adjusting of the focus in response to a current flow through said focusing coil, said end wall of the lens holder member having an aperture opening therethrough and dimensioned and located to loosely receive a distal end of said inner yoke member and thereby avoid interference with relative movements of said end wall along said shaft in the direction toward said base member so that substantially the full axial dimension of said cylindrical side wall can accommodate said focusing coil for achieving sensitivity of said adjusting of the focus while minimizing the axial dimension of said lens holder member.

2. An objective lens drive device according to claim 1; in which said bearing means also permits turning of said lens holder member relative to said base member about the axis of said shaft, said objective lens is mounted in said end wall at a radial distance from said axis of the shaft for effecting tracking adjustments in response to said turning, tracking coil means are mounted on said side wall of the lens holder member and cooperate with additional magnetic means for effecting said tracking adjustments in response to a current flow through said tracking coil means, elastic means are connected between said base member and said lens holder member for yieldably restoring the latter to a neutral position in respect to said tracking adjustments, and the reception of said inner yoke member in said aperture of the end wall limits said tracking adjustments for avoiding overstressing of said elastic means.

* * * * *